United States Patent Office 3,380,899
Patented Apr. 30, 1968

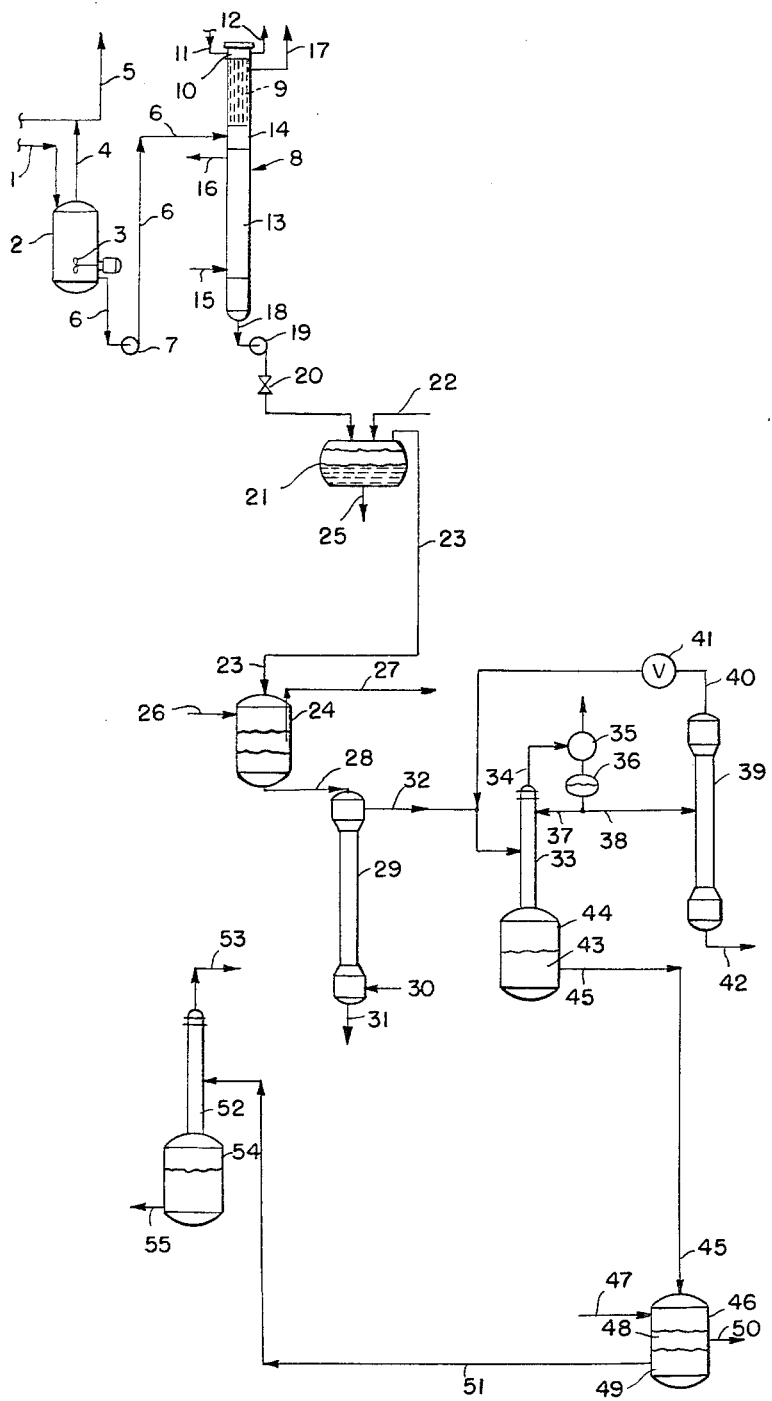

3,380,899
ELECTROLYTIC PREPARATION AND RECOVERY
OF TETRAALKYL LEAD COMPOUNDS
David G. Braithwaite, Chicago, and Lawrence L. Bott,
Oak Park, Ill., assignors to Nalco Chemical Company,
Chicago, Ill., a corporation of Delaware
Filed Oct. 16, 1964, Ser. No. 404,321
15 Claims. (Cl. 204—59)

This invention relates to a process of preparing and recovering tetraalkyl lead compounds, especially tetramethyl lead and tetraethyl lead, by a method wherein an electrolyzing current is passed through a sacrificial lead anode and an anhydrous solution of a Grignard reagent in an organic solvent and the tetraalkyl lead compound is recovered from the spent electrolyte.

One of the problems encountered in carrying out such a process is the recovery of the tetraalkyl lead compound and more particularly the removal of the organic solvent therefrom. Various types of organic solvents have been used, including water miscible and water immiscible solvents. The tetraalkyl lead compounds are insoluble in water. The solvents are relatively expensive substances and in order for the process to be practical they must be recovered and reused. Furthermore, in most cases the end use of the tetraalkyl lead compound as an additive to gasoline does not permit the inclusion of substantial amounts of solvents of the type that are ordinarily used in making the tetraalkyl lead compound.

Among the organic solvents for the Grignard reagent which have been found to be most practical are the diethers of glycols and especially the water immiscible high boiling diethers of glycols such as the dibutylether of diethylene glycol, the hexylethylether of diethylene glycol, and similar solvents of this type. These solvents are also used in conjunction with lower boiling water miscible ether solvents, such as tetrahydrofuran, which has been found to be very effective in enhancing the conductivity of the electrolyte.

In order to recover the tetraalkyl lead compound from the spent electrolyte and the solvents used in dissolving the Grignard reagent, one process which can be used is steam distillation. In such a process the tetraalkyl lead compound and lower boiling solvents are distilled leaving higher boiling solvents in the residue. It is also possible to use other types of distillation. In general, however, the tetraalkyl lead compounds become less stable when heated and especially when they become more concentrated during heating. Thus, the use of distillation processes in the recovery system leaves much to be desired. It would be desirable to be able to recover the tetraalkyl lead compounds by a recovery system which does not involve distillation of the tetraalkyl lead compounds.

One of the objects of the present invention is to provide a new and improved process for recovering tetraalkyl lead compounds from an electrolyte obtained by electrolyzing an anhydrous solution of a Grignard reagent in an organic solvent, using a sacrificial lead anode, in which a certain type of solvent for the Grignard reagent is employed and the electrolyte, after electrolysis, is passed through a recovery system in which impurities and solvents are removed from the tetraalkyl lead compound by extraction processes.

A further object of the invention is to provide a new and improved recovery system of the type described which is relatively simple, less costly and less hazardous than recovery systems involving the use of distillation for removal of the tetraalkyl lead compound from the residual electrolyte.

Another object of the invention is to provide a recovery system of the type described which is highly efficient.

Other objects and advantages of the invention will appear from the following description in conjunction with the accompanying drawing in which the single figure illustrates diagrammatically one type of apparatus and process suitable for the practice of the invention.

In accordance with the invention it has been found that in preparing tetraalkyl lead compounds by a process which involves electrolyzing, using a sacrificial lead anode, an anhydrous solution of a Grignard reagent in an organic solvent for said Grignard reagent, improved results are obtained by employing as at least one of the solvents for the Grignard reagent in the electrolyte a water immiscible diether of a glycol which is liquid under the conditions employed in the process and contains an aryl hydrocarbon group in at least one of the ether groups of said diether, mixing the resultant electrolyte, after electrolysis, with water to form an aqueous phase and an organic phase, extracting said organic phase with a water miscible solvent of a type capable of extracting aromatic hydrocarbons from aliphatic hydrocarbons, and recovering the tetraalkyl lead compound from the raffinate, that is, the residue which remains after the removal of the extract.

If the electrolyte contains an excess of alkyl halide, as, for example, where the electrolyzing process is carried out in the manner disclosed in U.S. Patent 3,007,858, the excess alkyl halide should be removed before the spent electrolyte is contacted with water. This can be accomplished in any suitable manner and does not form a part of the present invention.

When the spent electrolyte is contacted with water, two liquid phases are formed, the one being an aqueous phase and the other being an organic phase. The water serves to extract from the electrolyte soluble salts, such as magnesium halides, which form as a by-product during the electrolysis. Any unconverted Grignard reagent is also removed by the water in the aqueous phase due to the fact that the Grignard reagent reacts with water. In most cases, however, the electrolysis is preferably carried out substantially to the exhaustion of the Grignard reagent.

The organic phase is then separated from the aqueous phase and mixed with a solvent capable of extracting the said water immiscible diether of a glycol without substantially extracting the water insoluble tetraalkyl lead compound. As previously indicated, it has been found that an extraction solvent which is effective for this purpose is one which is capable of extracting aromatic hydrocarbons from aliphatic hydrocarbons. Suitable extraction solvents are diethylene glycol, triethylene glycol, mixtures of diethylene glycol and triethylene glycol, tetraethylene glycol, tetramethylene sulfone (also called sulfolane) and aqueous solutions of morpholine (e.g. 85% to 90% morpholine). Tetramethylene sulfone is made by the reaction of sulfur dioxide with butadiene to form sulfolene which is then hydrogenated to form tetramethylene sulfone or sulfolane.

Solvents of the sulfolane type as well as diethylene glycol have heretofore been used for extracting aromatic hydrocarbons, such as, benzene, toluene and xylene, from catalytic reformates in petroleum refineries but it was unexpected to discover that such solvents could be employed as extraction solvents for selectively separating certain types of organic ethers from tetraalkyl lead compounds. Since these extraction solvents normally boil at temperatures above the boiling point of water, they are readily separated from lower boiling solvents, such as tetrahydrofuran, which are preferably employed as a component part of the electrolyte in order to improve conductivity. Thus, the recovery process involving the use of such extraction solvents is well adapted for the recovery of tetraalkyl lead compounds from spent electrolytes containing both water miscible solvents boiling below the boiling point of water and water immiscible solvents of the type previously described boiling above the boiling point of water. It is also relatively simple to remove water from the recovered solvents so that they can be reused in the electrolyte.

The water immiscible high boiling solvents for the Grignard reagent which are especially effective in the practice of the invention are compounds or mixtures of compounds having the following general formula:

$$R\text{—}(OCH_2CH_2)_nOR_1$$

wherein one of the radicals R and $R_1$ is a benzyl radical and the other is an aliphatic hydrocarbon radical containing 1 to 6 carbon atoms, and $n$ is 2 to 6, preferably 3 to 4. A preferred solvent for the purpose of the invention is one in which the radical R is benzyl, the radical $R_1$ is ethyl and $n$ is 3. This substance is hereinafter referred to as the benzylethylether of triethylene glycol. It is a substantially water immiscible diether of a glycol which is soluble in water to the extent of not more than about 2.0% at 20° C. and has a boiling point range of 320–340° C.

These special solvents which contain a terminal benzylether group as well as a terminal lower aliphatic hydrocarbon ether group are compatible with tetrahydrofuran and are preferably used in admixture with tetrahydrofuran as a solvent for the Grignard reagent in order to make it possible to operate the process at a higher electrode current density. Usually, it is preferable to carry out the electrolysis with a mixture of tetrahydrofuran and a water immiscible diether of a glycol having at least one benzylether group while using proportions of tetrahydrofuran in excess of 50% by weight and not more than 75% by weight of the total of the two solvents. A preferred solvent system for the electrolysis is one which contains about 60% by weight tetrahydrofuran and about 40% by weight of the benzylethylether of triethylene glycol based on the total weight of the two solvents. The molar ratio of tetrahydrofuran to the water immiscible diether solvent of the type described preferably is within the range from about 3.3:1 to 13:1.

Apart from the fact that the electrolyte should contain a particular type of water immiscible diether solvent in which at least one of the ether groups of said diether contains an aryl hydrocarbon group and preferably the benzyl group, the present invention is not concerned with the specific conditions employed during the electrolysis. In general, where tetrahydrofuran is used in the electrolyte, the quantity thereof is at least 0.5 mole per mole of Grignard reagent and does not exceed the amount at which substantial formation of insoluble by-products begins to occur.

The minimum quantity of the water immiscible glycol diether in the electrolyte will depend upon whether it is being used alone or in combination with other solvents, such as tetrahydrofuran. When it is being used in combination with tetrahydrofuran, the minimum quantity can be as low as 0.4 mole per mole of Grignard reagent.

The term "Grignard reagent" as used herein refers to the product obtained by reacting approximately equimolar proportions of a compound having the formula RX and Mg according to the equation:

$$RX + Mg \rightarrow RMgX$$

in which R represents the organic radical, X represents the halogen atom of the Grignard reagent, and Mg is the conventional symbol for magnesium. The radical R can be, for example, methyl, ethyl, propyl, isopropyl, butyl and higher homologues. The radical X can be, for example, chlorine, bromine or iodine.

The principal reactions contemplated by the invention are those in which a Grignard reagent is electrolyzed in the presence of a sacrificial lead anode and in which R is methyl and/or ethyl, and X is chlorine. Thus, tetramethyl lead can be made in accordance with the invention by electrolyzing methyl magnesium chloride, using a lead anode, and tetraethyl lead can be made in accordance with the invention by electrolyzing ethyl magnesium chloride, using a lead anode.

The invention also contemplates the manufacture of mixed alkyl lead compounds, such as, triethylmethyl lead, diethyldimethyl lead and ethyltrimethyl lead, usually in the form of mixtures with tetraethyl lead and tetramethyl lead, by using as the electrolyte mixtures of methyl magnesium chloride and ethyl magnesium chloride. Specific examples of other Grignard reagents are ethyl magnesium bromide, isopropyl magnesium chloride, isopropyl magnesium bromide, butyl magnesium chloride, butyl magnesium bromide, amyl magnesium bromide, amyl magnesium chloride, and higher alkyl homologues.

The cathode can be composed of a suitable conducting but non-reactive material, such as platinum, stainless steel, ordinary steel, graphite, or other conducting material, which does not dissolve in the electrolyte. In some cases the cathode may be composed of the same material as the anode. Thus, both the cathode and the anode can be composed of lead. It is preferable, however, that the anode be composed of lead and the cathode of steel.

The process is preferably carried out by adding an extraneous organic alkyl halide to the electrolyte during the electrolysis or by adding two or more organic halides to an electrolyte containing either a single Grignard reagent or a mixture of Grignard reagents. Thus, by adding two different alkyl halides to the Grignard reagent dissolved in the organic solvent, for example, by adding methyl chloride and ethyl chloride to a Grignard reagent consisting initially of methyl magnesium chloride dissolved in an organic ether, such as the benzylethylether of triethylene glycol, organo lead compounds are obtained containing both methyl and ethyl radicals linked to the metallic lead atom. Similarly, if mixtures of methyl chloride and tertiary butyl chloride are used as the extraneous halides, the resultant compounds contain methyl groups and tertiary butyl groups linked to the lead atom, or if mixtures of ethyl chloride and tertiary butyl chloride are used, the resultant compounds contain both ethyl groups and tertiary butyl groups linked to the lead atom.

The process is normally carried out at temperatures above the freezing point of the solution and below the boiling points of the glycol diether solvent. Higher current densities tend to heat the solution and cooling may be applied, if necessary. In general, good results are obtained at temperatures within the range of 20° C. to 65° C. and in the preparation of tetramethyl lead and tetraethyl lead temperatures within the range of 30° C. to 50° C. are preferably employed.

The pressures used are normally sufficient to maintain the liquid phase with the particular solvent and temperature conditions employed. According to one method of operating the process, extraneous organic halide, such as, for example, methyl chloride and/or ethyl chloride, is added to the electrolyte and superatmospheric pressures normally prevail in the reaction cell. These pressures will vary, depending upon the quantity of organic halide and the type of solvent, but in general, the process will be operated at pressures less than 5 atmospheres.

The optimum conditions during electrolysis will vary depending upon the particular organic halides used but it is preferable to operate with a total concentration of extraneous organic halides within the range of 0.1 to 1.1 moles per mole of total Grignard reagent. The term "extraneous" as used herein with reference to extraneous organic halide means that an excess or additional quantity of the organic halide is employed over the equi-molecular proportions initially required to react with magnesium to form a Grignard reagent.

In carrying out the process, the initial Grignard concentration is subject to wide variation, but is preferably within the range of 0.5 to 2.5 millimoles per gram of solution.

The critical point of the invention does not lie in the particular voltages or amperages used in the electrolysis. These are preferably within the range of 2 to 35 volts and the current requirements are preferably within the range of 2 amperes to 30 amperes. The current density will usually vary within the range of about 2 amperes per square foot to 30 amperes per square foot. The optimum current density will vary somewhat depending upon the temperature.

The type of electrolytic cell used is also subject to variation and does not constitute a part of this invention. A suitable type of cell is disclosed in U.S. Patent 3,141,841.

The best mode contemplated for the practice of the invention is illustrated by the following examples in which the quantities are stated in parts by weight unless otherwise indicated.

Example I

A Grignard solution was prepared by mixing together 5220 parts of tetrahydrofuran, 3470 parts of the benzylethylether of triethylene glycol having a boiling range from 320–340° C., 425 parts of magnesium and 885 parts of methyl chloride at a temperature of 33–39° C. under a pressure of 5 p.s.i.g. The methyl chloride was added gradually over a 3½ hour period.

The resultant methyl magnesium chloride-solvent solution containing a slight excess of methyl chloride was then electrolyzed at a temperature of about 46° C. and additional methyl chloride was added to give 3 weight percent of excess methyl chloride.

The run was carried out at an average temperature of 46° C. for a period of 14.75 hours. The voltage used was approximately 28 volts and the total ampere hours were 344. The current density was about 16.7 amperes per square foot. The current efficiency was approximately 174%. The run was continued until the Grignard conversion was 87.5% and the tetramethyl lead, based on the Grignard reagent converted, was 100%. The yield based on the magnesium charged was 82.5%.

The electrolysis solvent system consisted of 60% by weight tetrahydrofuran and 40% by weight of the benzylethylether of triethylene glycol.

After electrolysis and formation of the tetramethyl lead, the residual electrolyte was passed into a recovery system of the type shown in the drawing. In this system the residual electrolyte containing tetramethyl lead, tetrahydrofuran, the benzylethylether of triethylene glycol, methyl chloride and some dissolved gaseous hydrocarbons is introduced through pipe or line 1 to a holder or surge tank 2 equipped with a motor driven agitator 3. A portion of the methyl chloride escapes through an outlet from the top of the vessel to line 4 and is returned through line 5 to storage for reuse in making Grignard reagent.

The residual electrolyte is pumped from vessel 2 through line 6 by means of pump 7 to a stripping tower 8 provided with a series of vertically arranged plates or baffles or tubes 9 in the upper portion thereof. The upper end of the stripping tower 8 is also provided with a cooling jacket 10 having a cold water inlet 11 and an outlet 12. The lower part of the tower 13 is provided with baffles or rings, not shown, which are adapted to facilitate the liberation of any gases present in the residual electrolyte introduced into the upper central portion of the tower 14 through line 6.

The lower part of the tower 8 is heated by hot water which circulates through lines 15 and 16. The temperature of the water is subject to variation depending upon the particular organic lead compound being recovered and the solvents present but with an electrolyte of the type described this temperature is usually around 110–115° C. at atmospheric pressure or slightly above. An inert gas, such as natural gas, can be added to the electrolyte, for example, by metering it continuously into the electrolyte in the lower part of tower 8 to facilitate stripping the methyl chloride. The methyl chloride escapes from the top of the tower through line 17 and may contain very small amounts of tetrahydrofuran and tetramethyl lead. However, since it is anhydrous, it can be used directly in subsequent operations.

The residual electrolyte from which the methyl chloride has now been removed is withdrawn from the bottom of tower 8 through line 18 and pumped by means of pump 19 through valve 20 to a mixing tank 21. A dilute aqueous solution of hydrochloric acid (pH 3–4) is introduced into tank 21 through line 22, preferably in a proportion of about 0.8 to 1.0 volume of solution per volume of electrolyte. Two layers are formed, the bottom layer being a brine layer and the top layer being an organic liquid layer. The organic top layer contains tetramethyl lead, tetrahydrofuran and the benzylethylether of triethylene glycol. This layer is withdrawn through line 23 to a pressure tank 24. The brine layer which consists principally of magnesium chloride in water is withdrawn through line 25.

In pressure tank 24 the organic phase is mixed with fresh water in an approximately equal volume ratio introduced through line 26. Again two layers are formed, the higher density bottom layer containing tetramethyl lead, some tetrahydrofuran and most of the benzylethylether of triethylene glycol. The top layer contains water, most of the tetrahydrofuran and some benzylethylether of triethylene glycol. The top layer is drawn off through line 27 and dried so that the mixture of tetrahydrofuran and benzylethylether of triethylene glycol can be reused in the process.

The bottom layer is passed through line 28 to a countercurrent liquid-liquid extraction tower 29. An extraction solvent is introduced into this tower through line 30.

A typical extraction solvent suitable for the practice of the invention is a mixture of equal weights of diethylene glycol and triethylene glycol. The proportion of this solvent is preferably about 3 to 5 volumes per volume of the organic layer introduced into extraction tower 29 through line 28. The residue from tower 29 is tetramethyl lead which is withdrawn through line 31. The extraction glycols and the remaining ethers pass from the top of extraction tower 29 through line 32 to distillation column 33.

The lower boiling tetrahydrofuran is distilled overhead from column 33 via the vapor line 34, condensed by condenser 35 and sent to reflux drum 36. Here a portion of the tetrahydrofuran is returned via line 37 to distillation column 33 to serve as a reflux while the remainder is withdrawn through line 38 to azeotropic column 39. The overhead can be recirculated through line 40 and valve 41 to column 33. Dry tetrahydrofuran is withdrawn through line 42 for reuse in the process.

The bottoms 43 in receiver 44 consist essentially of the benzylethylether of triethylene glycol and the mixture of diethylene glycol and triethylene glycol employed as the extraction solvent. These bottoms are then passed through line 45 to extraction tank 46 and are extracted with water introduced through line 47. Two layers are formed. The top layer 48 is essentially a mixture of the benzylethylether of triethylene glycol and water while the bottom layer 49 is a mixture of diethylene glycol, triethylene glycol and water. The top layer is passed through line 50 to a suitable gas drier, not shown, where the water is removed and dry benzylethylether of triethylene glycol is recovered for reuse in the process. The bottom layer 49 comprising approximately 75% glycols and 25% water is passed through line 51 to distillation tower 52 where water is distilled out of the mixture through line 53 leaving behind in receiver 54 the glycol extractants containing less than 1% water, which are removed through line 55 for reuse in the process.

Example II

The procedure is the same as that described in Example I except that ethyl chloride is used instead of methyl chloride to form ethyl magnesium chloride as the Grignard reagent. In this case an excess of ethyl chloride corresponding to about 0.9 mole per mole of Grignard reagent is employed.

Tetraethyl lead is recovered from the raffinate phase after extraction of the ethers with the extraction solvent consisting of a mixture of equal parts by weight of diethylene glycol and triethylene glycol and the remainder of the process is the same as that described with respect to Example I.

The process can also be carried out by including as one of the solvents an aromatic hydrocarbon, such as toluene, benzene or xylene, which can be added before, during or after the electrolysis. These substances are used as stabilizing agents for the tetraalkyl lead compound and also to reduce the concentration of the tetraalkyl lead compound. If the automatic hydrocarbon, for example, toluene, is added to the electrolyte before electrolysis, a stabilizing quantity is used which does not normally exceed 0.5 mole per mole of Grignard reagent. Larger amounts of aromatic hydrocarbons have been used and in the case of benzene amounts as high as eight moles per mole of Grignard reagent have been employed. As a general rule, however, it is preferable in the practice of this invention with the particular recovery system herein described to employ a solvent system consisting essentially of organic ethers of which at least one should be a water immiscible diether of a glycol in which at least one of the ether groups contains an aryl hydrocarbon group, for example, a benzyl group. It will be recognized that the number of oxyethylene groups in the glycol should be sufficiently small that the diether is water immiscible.

The invention is especially advantageous in making it possible to selectively separate tetraalkyl lead compounds, such as tetramethyl lead and tetraethyl lead from solvents used in their preparation without the necessity for subjecting the tetraalkyl lead compounds to heat or distillation. Ordinary atmospheric temperatures can be used in the extraction process. By the use of this solvent and recovery system, organic ether solvents, such as the benzylethylether of triethylene glycol can be easily separated from tetramethyl lead and tetraethyl lead, whereas solvents, such as the hexylethylether of diethylene glycol, can be separated from tetramethyl lead and tetraethyl lead only with much more difficulty.

It will be understood that the arrangement of the apparatus shown in the drawing is diagrammatic and various modifications, including the addition of valves, pumps, and piping, can be made without departing from the invention.

The invention is hereby claimed as follows:

1. In a process for preparing a water insoluble tetraalkyl lead compound by electrolyzing an anhydrous solution of a Grignard reagent in an organic solvent, using a sacrificial lead anode, the improvement which comprises using as at least one of the solvents for said Grignard reagent a water immiscible diether of a glycol which is liquid under the conditions employed in the process and contains an aryl hydrocarbon group in at least one of the ether groups of said diether, mixing the resultant electrolyte, after electrolysis, with water to form an aqueous phase and an organic phase, extracting said organic phase with a water miscible extraction solvent of a type capable of extracting aromatic hydrocarbons from aliphatic hydrocarbons, and recovering said tetraalkyl compound from the raffinate.

2. A process as claimed in claim 1 in which said water immiscible diether of a glycol has the following formula $$R—(OCH_2CH_2)_nOR_1$$

wherein one of the radicals R and $R_1$ is a benzyl radical and the other is an aliphatic hydrocarbon radical containing 1 to 6 carbon atoms, and $n$ is 2 to 6.

3. A process as claimed in claim 1 in which said water miscible extraction solvent is diethylene glycol.

4. A process as claimed in claim 1 in which said water miscible extraction solvent is triethylene glycol.

5. A process as claimed in claim 1 in which said water miscible extraction solvent is a mixture of diethylene glycol and triethylene glycol.

6. A process as claimed in claim 1 in which said water miscible extraction solvent is tetramethylene sulfone.

7. A process as claimed in claim 1 in which said water miscible extraction solvent is an aqueous solution of morpholine.

8. A process for preparing tetraalkyl lead compounds which comprises electrolyzing, using a sacrificial lead anode, an anhydrous solution of a Grignard reagent in a water immiscible diether of a glycol having the following chemical formula $$C_6H_5CH_2(OCH_2CH_2)_nOC_2H_5$$

wherein $n$ is 3 to 4, thereby forming a residual electrolyte containing said tetraalkyl lead compound and said diether, mixing said residual electrolyte with water, thereby forming an aqueous layer and an organic layer, separating said layers from one another, mixing said organic layer with a water miscible extraction solvent in which said diether is soluble, thereby forming two liquid phases, the first phase containing substantially all of the tetraalkyl lead compound and the second phase containing said diether and said water miscible solvent, recovering said tetraalkyl lead compound from said first phase, and separating said water miscible solvent from said water immiscible diether contained in said second phase.

9. A process as claimed in claim 8 in which said Grignard reagent is a methyl Grignard reagent made by reacting magnesium with methyl chloride, said tetraalkyl lead compound is tetramethyl lead, and said water miscible extraction solvent is at least one polyethylene glycol from the group consisting of diethylene glycol, triethylene glycol and tetraethylene glycol.

10. A process as claimed in claim 8 in which said Grignard reagent is an ethyl Grignard reagent made by reacting magnesium with ethyl chloride, said tetraalkyl lead compound is tetraethyl lead, and said water miscible extraction solvent is at least one polyethylene glycol from the group consisting of diethylene glycol, triethylene glycol and tetraethylene glycol.

11. A process as claimed in claim 8 in which said water miscible extraction solvent is tetramethylene sulfone.

12. A process as claimed in claim 8 in which said water miscible extraction solvent is aqueous morpholine.

13. A process for preparing tetraalkyl lead compounds which comprises electrolyzing, using a sacrificial lead anode, an anhydrous solution of a Grignard reagent in tetrahydrofuran and a water immiscible diether of a glycol having the following chemical formula $$C_6H_5CH_2(OCH_2CH_2)_nOC_2H_5$$

wherein $n$ is 3 to 4, thereby forming a residual electrolyte containing said tetraalkyl lead compound, tetrahydrofuran, and said diether, mixing said residual electrolyte with water containing an acid in amount sufficient to hydrolyze magnesium oxyhalides, thereby forming an aqueous brine layer and an organic layer, separating said layers from one another, adding more water to the separated organic layer to form a second aqueous layer containing most of the tetrahydrofuran and an organic layer containing the water insoluble components, recovering tetrahydrofuran from said second aqueous layer, mixing said last named organic layer with a water miscible extraction solvent in which said diether is soluble, thereby forming two liquid phases, the first phase containing substantially all of the tetraalkyl lead compound and the second phase containing said diether, some tetrahydrofuran and said water miscible solvent, recovering said tetraalkyl lead compound from said first phase, and separating said water miscible solvent and tetrahydrofuran from said water immiscible diether contained in said second phase.

14. A process as claimed in claim 13 in which tetrahydrofuran is distilled from said second phase.

15. A process as claimed in claim 14 in which the raffinate from the distillation of tetrahydrofuran is further extracted with water to remove water miscible extraction solvent from said water immiscible diether.

References Cited
UNITED STATES PATENTS

| | | | |
|---|---|---|---|
| 3,118,825 | 1/1964 | Linsk | 204—59 |
| 3,312,605 | 4/1967 | Braithwaite | 204—59 |

HOWARD S. WILLIAMS, *Primary Examiner.*